(12) United States Patent
Zhai et al.

(10) Patent No.: US 10,768,476 B1
(45) Date of Patent: Sep. 8, 2020

(54) DISPLAY DEVICE

(71) Applicant: Shanghai Tianma Micro-Electronics Co., Ltd., Shanghai (CN)

(72) Inventors: Yingteng Zhai, Shanghai (CN); Jialing Li, Shanghai (CN)

(73) Assignee: SHANGHAI TIANMA MICRO-ELECTRONICS CO., LTD., Shanghai (CN)

( * ) Notice: Subject to any disclaimer, the term of this patent is extended or adjusted under 35 U.S.C. 154(b) by 0 days.

(21) Appl. No.: 16/456,735

(22) Filed: Jun. 28, 2019

(30) Foreign Application Priority Data

Feb. 28, 2019 (CN) .......................... 2019 1 0150448

(51) Int. Cl.
| | | |
|---|---|---|
| *G02F 1/13357* | (2006.01) | |
| *G02F 1/1335* | (2006.01) | |
| *G02F 1/13363* | (2006.01) | |

(52) U.S. Cl.
CPC ...... *G02F 1/1336* (2013.01); *G02F 1/133528* (2013.01); *G02F 1/133632* (2013.01)

(58) Field of Classification Search
CPC .............. G02F 1/1336; G02F 1/13363; G02F 1/133528
See application file for complete search history.

(56) References Cited

U.S. PATENT DOCUMENTS

| | | | | |
|---|---|---|---|---|
| 2010/0027133 | A1* | 2/2010 | Matsui | G03B 17/17 359/676 |
| 2010/0171927 | A1* | 7/2010 | Kitano | G02B 26/06 353/20 |
| 2013/0176350 | A1* | 7/2013 | Fergason | H04N 13/395 345/690 |

FOREIGN PATENT DOCUMENTS

| | | |
|---|---|---|
| CN | 102608747 A | 7/2012 |
| CN | 108254919 A | 7/2018 |

OTHER PUBLICATIONS

Peng et al. Resolution Enhanced Light Field Near-to-Eye Display Using E-shifting Method with Birefringent Plate Society for Information Display (SID) Display Week 2018 Distinguished Papers.

\* cited by examiner

*Primary Examiner* — Nathanael R Briggs
(74) *Attorney, Agent, or Firm* — Anova Law Group PLLC

(57) ABSTRACT

A display device is provided. The display device includes a display panel including a light-exiting side, and a birefringent structure disposed at the light-exiting side of the display panel. A plane of the birefringent structure is parallel to a plane of the display panel. When the display device is in a display stage, the birefringent structure and the display panel are configured with a relative rotation at a plane parallel to the plane of the birefringent structure.

20 Claims, 9 Drawing Sheets

DISPLAY DEVICE

CROSS-REFERENCES TO RELATED APPLICATIONS

This application claims priority of Chinese Patent Application No. 201910150448.4, filed on Feb. 28, 2019, the entire content of which is hereby incorporated by reference.

FIELD OF THE INVENTION

The present disclosure generally relates to the field of display technologies and, more particularly, relates to display devices.

BACKGROUND

With development of technologies, design of display devices is constantly pursuing smooth usage experience, and meanwhile, it is increasingly pursuing sensory experiences of users. Performances, such as wide viewing angle, high resolution, narrow border, high screen ratio, etc., have become selling points for display devices. Display devices in the prior art generally use a lens imaging method to expand visual angles of human eyes, but resolutions of display screens of the display devices may not be greatly improved. Accordingly, viewing angle resolutions may decrease, and image qualities may deteriorate. This phenomenon is mainly manifested as a screen window effect of a black matrix (BM).

In existing technologies, a technique of adding an array of micro-lenses on a light-exiting side of a display panel is generally used to solve this problem. Accordingly, areas of light spots may be increased, and spacings between pixels may be reduced. But, micro-lenses may have a high cost. Further, the micro-lenses may need to be accurately aligned with the display panel, so processes forming the display devices may be difficult, and product yields may be reduced.

The disclosed methods and structures are directed to solve one or more problems set forth above and other problems in the art.

SUMMARY

One aspect of the present disclosure includes a display device. The display device includes a display panel including a light-exiting side, and a birefringent structure disposed at the light-exiting side of the display panel. A plane of the birefringent structure is parallel to a plane of the display panel. When the display device is in a display stage, the birefringent structure and the display panel are configured with a relative rotation at a plane parallel to the plane of the birefringent structure.

Other aspects of the present disclosure can be understood by those skilled in the art in light of the description, the claims, and the drawings of the present disclosure.

BRIEF DESCRIPTION OF THE DRAWINGS

The following drawings are merely examples for illustrative purposes according to various disclosed embodiments and are not intended to limit the scope of the present disclosure.

DETAILED DESCRIPTION

To make the objectives, technical solutions and advantages of the present invention more clear and explicit, the present invention is described in further detail with accompanying drawings and embodiments. It should be understood that the specific exemplary embodiments described herein are only for explaining the present invention and are not intended to limit the present invention.

Reference will now be made in detail to exemplary embodiments of the present invention, which are illustrated in the accompanying drawings. Wherever possible, the same reference numbers will be used throughout the drawings to refer to the same or like parts.

It should be noted that relative arrangements of components and steps, numerical expressions and numerical values set forth in exemplary embodiments are for purpose of illustration only and are not intended to limit the present invention unless otherwise specified. Techniques, methods and apparatus known to the skilled in the relevant art may not be discussed in detail, but these techniques, methods and apparatus should be considered as a part of the specification, where appropriate.

Figure 1:
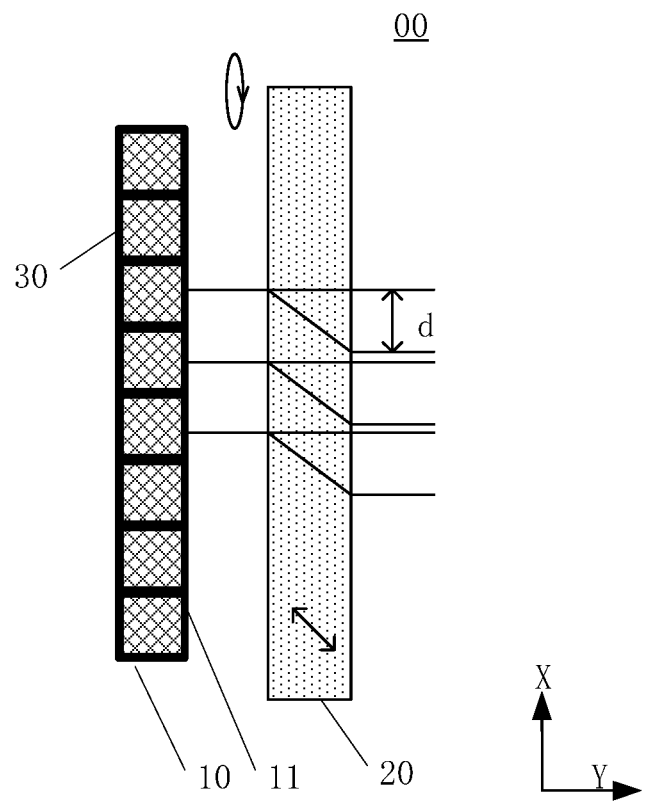
FIG. 1 illustrates an exemplary display device consistent with the disclosed embodiments.

FIG. 1 illustrates an exemplary display device consistent with the disclosed embodiments. As shown in FIG. 1, the display device 00 includes a display panel 10 that includes a light-exiting side 11. At the light-exiting side 11 of the display panel, a birefringent structure 20 is provided. A plane of the birefringent structure 20 is parallel to a plane of the display panel 10. The plane of the birefringent structure 20 refers to a plane where the birefringent structure 20 is located, and the plane of the display panel 10 refers to a plane where the display panel 10 is located. When the display device 00 is in a display stage, there is a relative rotation between the birefringent structure 20 and the display panel 10 at a plane parallel to the plane of the birefringent structure 20.

The display panel 10 may include a plurality of pixels 30, and the birefringent structure 20 is a film layer with a birefringence function. Birefringence is a phenomenon in which a light beam is incident on an anisotropic birefringent structure and decomposes into two light beams refracted in different directions. When light propagates in a heterogeneous object, its propagation speed and refractive index may change with its oscillation direction, and thus a heterogeneous object may have more than one refractive index values.

When a light wave is incident on a heterogeneous object, except for specific directions, birefringence may occur. The light wave may decompose into two polarized lights whose oscillation directions are perpendicular to each other, whose propagation speeds and refractive indexes are different from each other. This phenomenon is called birefringence. The specific directions here refer to optical axis directions of the birefringent structure and when lights propagate in these directions, no birefringence may occur. If a light is incident in a direction along an optical axis of a birefringent structure, birefringence may not occur. When a light is perpendicularly incident on a birefringent structure, if a polarization direction of the incident light is perpendicular to the optical axis direction of the birefringent structure, the incident light may not undergo birefringence. A double arrow direction in FIG. 1 indicates an optical axis direction of the birefringent structure.

A pixel 30 may include a plurality of sub-pixels, for example, a red sub-pixel (R), a green sub-pixel (G), and a blue sub-pixel (B). Correspondingly, light emitted by the pixel 30 may include red light, green light, and blue light respectively. The red light, the green light, and the blue light may then enter the birefringent structure 20. The pixel 30 may also include a blank sub-pixel. The present disclosure does not limit colors of the pixel 30.

In FIG. 1, only one light ray is used for schematic illustration. It may be understood that a light output of each pixel on the display panel 10 is a beam of light. To indicate light direction and light deflection, a spacing is shown between the display panel 10 and the birefringent structure 20. The display panel 10 and the birefringent structure 20 may be adhered together. A distance between the display panel 10 and the birefringent structure 20 may be designed according to actual needs, and the present disclosure does not limit the distance between the display panel 10 and the birefringent structure 20. Further, FIG. 1 only illustrates a positional relationship between the display panel 10 and the birefringent structure 20. In actual manufacturing of the display device 00, there may be other film layers between the display panel 10 and the birefringent structure 20 according to specific applications.

Figure 2:
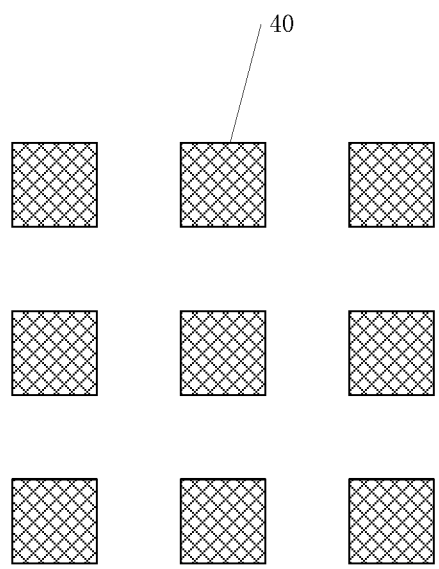
FIG. 2 illustrates images displayed by a display device in the prior art.

FIG. 2 illustrates images displayed by a display device in the prior art. The pixels of the display panel may have a shape of square as an example. As shown in FIG. 2, the images 40 displayed by the display device may have a screen window effect. That is, there may be gaps between the images 40 and the gaps may be large, and thus there may be a plurality of nettings visually.

Figure 3:
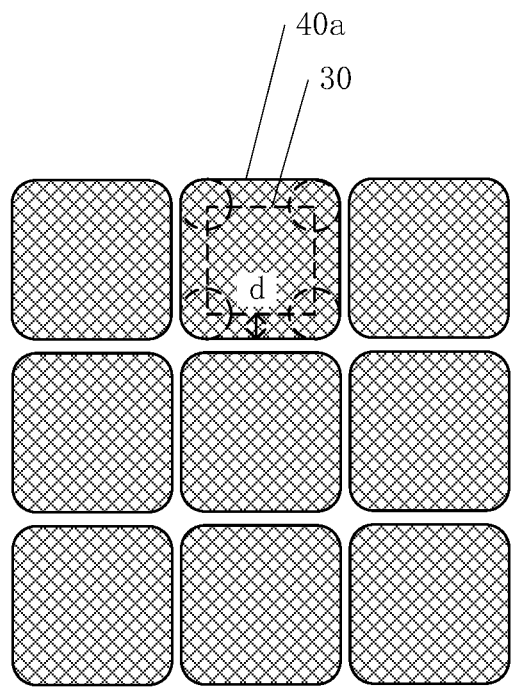
FIG. 3 illustrates images displayed by an exemplary display device consistent with the disclosed embodiments.

FIG. 3 illustrates images displayed by an exemplary display device consistent with the disclosed embodiments. The pixels in the display device may have a shape of square as an example. As shown in FIG. 3, in the images 40a displayed by the display device, the screen window effect may be weakened. The images 40a in FIG. 3 correspond to images formed by output lights of the display panel 10 shown in FIG. 1 after passing through the birefringent structure 20. Compared to the gaps between the images 40 shown in FIG. 2, gaps between the images 40a are reduced.

Referring to FIG. 1 and FIG. 3, display devices provided by the present disclosure may have at least the following technical effects. Birefringence may occur when lights from the light-exiting side 11 of the panel 10 pass through the birefringent structure 20. When the display device 00 is in a display stage, there may be a relative rotation between the birefringent structure 20 and the display panel 10 at a plane parallel to a plane of the birefringent structure 20. A pixel 30 may be divided into an infinite number of points. Due to the relative rotation between the birefringent structure 20 and the display panel 10, each of the points may rotate on its original position. As shown in FIG. 3, four corners of the rectangular pixel 30 respectively rotate into circles on their original positions, and the images 40a of the rectangular pixels 30 finally formed may have a shape of rounded rectangle. The rounded rectangle in the present disclosure refers to a rectangle whose four corners have a circular arc shape, and the circular arc shape is a part of a circle.

Lines connecting centers of the four corners of the rounded rectangle show an area of the original pixel 30. A distance from an edge of the image 40a to an edge of a corresponding pixel 30 is d. The distance d corresponds to a deflection distance d of lights passing through the birefringent structure in the first direction X in FIG. 1. The deflection distance d visually enlarges an area of the image 40a, increases the light-exiting area of each pixel of the display device, and reduces the gaps between the images 40a. Accordingly, the screen window effect caused by the black matrix in the prior art may be weakened. In addition, since the birefringent structure 20 is used, a display brightness may be improved. The display effect may thus be improved.

Figure 4:
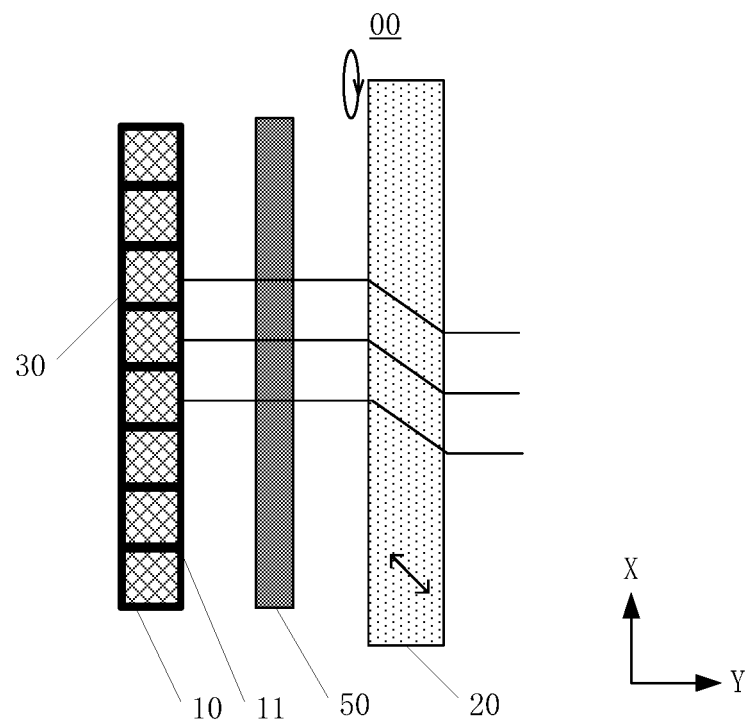
FIG. 4 illustrates another exemplary display device consistent with the disclosed embodiments.

FIG. 4 illustrates another exemplary display device consistent with the disclosed embodiments. As shown in FIG. 4, the display device also includes a polarizer 50 between the display panel 10 and the birefringent structure 20. A plane of the polarizer 50 is parallel to the plane of the display panel 10. In the present disclosure, the plane of the polarizer refers to a plane where the polarizer is located.

It should be noted that the schematic diagrams of the present disclosure only illustrate cases where only the birefringent structure 20 rotates. The relative rotation between the display panel 10 and the birefringent structure 20 may also be cases where only the display panel 10 rotates, or both the display panel 10 and the birefringent structure 20 rotate.

Lights emitted from the display panel 10 may include two kinds of polarized lights whose oscillation directions are perpendicular to each other. After the lights enter the birefringent structure 20, birefringence may occur, and the light may thus decompose into two kinds of polarized lights whose oscillation directions are perpendicular to each other. Propagation speeds and refraction rates of the two kinds of polarized lights may be different. As shown in FIG. 1, one of the polarized lights is ordinary light (light whose propagation direction remains unchanged in the birefringent structure), and the other polarized light is extraordinary light (light whose propagation direction inside the birefringent structure is at a certain angle with the second direction Y).

As shown in FIG. 4, the polarizer 50 is located between the display panel 10 and the birefringent structure 20. The polarizer 50 may absorb light having a horizontal deflection direction. In this case, the light with a polarization direction perpendicular to an optical axis of the birefringent structure may be absorbed. Accordingly, after passing through the polarizer 50, the polarized light that enters the birefringent structure 20 and undergoes birefringence only includes extraordinary light and does not include ordinary light.

It should be noted that the polarizer 50 shown in FIG. 4 may also increase the light-exiting area of each pixel of the display device and weaken the screen window effect. But the display brightness of the display device with the polarizer 50 may be slightly different from the display brightness of the display device without the polarizer 50. This is because a propagation direction of the light with a horizontal deflection direction does not change after passing through the birefringent crystal. When there is a relative rotation between the birefringence structure and the display panel, the light with a horizontal deflection direction may be in the middle of the image, that is, the light retains a position of the original pixel. Accordingly, a brightness of a central part of the image may be higher than a brightness of an edge of the image. After the light with a horizontal deflection direction is removed, the brightness of the central part of the image is consistent with the brightness of the edge of the image, and thus the display may be more uniform. The present disclosure does not limit types and materials of the polarizer 50, and the types and the materials of the polarizer 50 may be selected according to actual needs.

As shown in FIG. 1 and FIG. 3, the display panel 10 may include a plurality of pixels 30, and a plurality of images 40a may be formed after lights from the plurality of pixels 30 pass through the birefringent structure 20. Orthographic projections of adjacent images 40a on the plane of the birefringent structure 20 do not overlap. The images 40a in FIG. 3 are images formed by the plurality of pixels 30 in FIG. 1 after passing through the birefringent structure 20. Since orthographic projections of the adjacent images 40a on the plane of the birefringent structure 20 do not overlap, image crosstalk may be avoided. Since birefringence occurs after the lights from the pixels 30 pass through the birefringent structure 20, light-exiting areas of the pixels 30 may be enlarged. However, if the orthographic projections of adjacent images 40a overlap, image crosstalk may occur, and the display effect may thus be poor. In one embodiment, the orthographic projections of adjacent images 40a on the plane of the birefringent structure 20 do not overlap, and crosstalk between the images 40a may be avoided.

Figure 5:
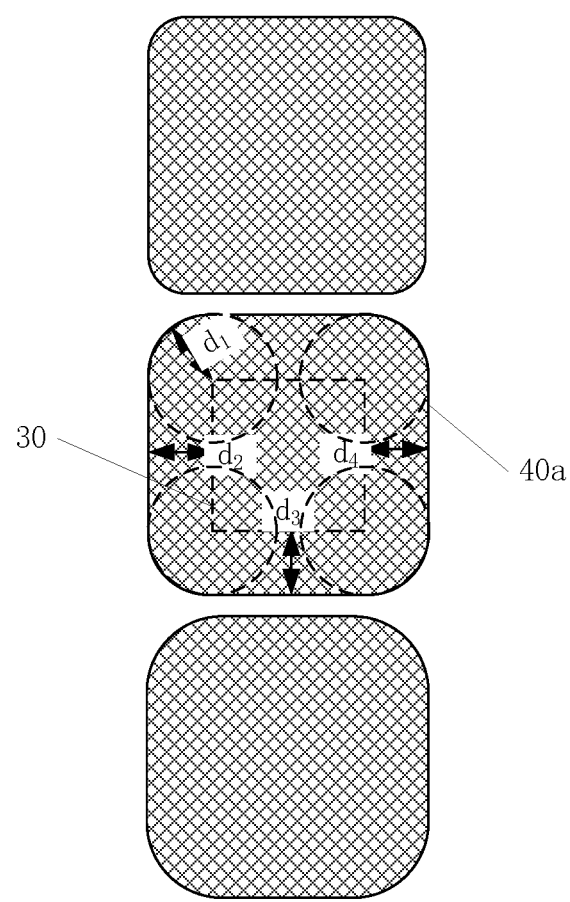
FIG. 5 illustrates an exemplary comparison of pixels with images of the pixels after passing through a birefringent structure, consistent with the disclosed embodiments.

FIG. 5 illustrates an exemplary comparison of pixels with images of the pixels after passing through a birefringent structure. As shown in FIG. 5, an area of each of the images 40a is larger than an area of a corresponding pixel 30. The shortest distances between edges of the orthographic projection of the image 40a on the plane of the birefringent structure and edges of the orthographic projection of the corresponding pixel 30 on the plane of the birefringent structure are equal.

In FIG. 5, as an example, the pixels 30 has a shape of square. The pixels 30 may have other shapes, and the pixels 30 with different shapes may work with a same principle. In FIG. 5, an area represented by a dashed box is an area of the pixel 30. An area of the image 40a is larger than the area of the pixel 30. Minimum distances between edges of an orthographic projection of the image 40a on the plane of the birefringent structure and edges of an orthographic projection of the corresponding pixel 30 on the plane of the birefringent structure, are d1, d2, d3, and d4, respectively, where d1=d2=d3=d4. In this case, center points of the pixel 30 and the image 40a are coincident, and the light-exiting area of the pixel 30 may be enlarged. Since d1=d2=d3=d4, display uniformity may be ensured, and display quality may be improved. It should be noted that d1, d2, d3 and d4 are the shortest distances, not distances between any two points. Locations of the shortest distances may be seen from FIG. 5.

Figure 6:
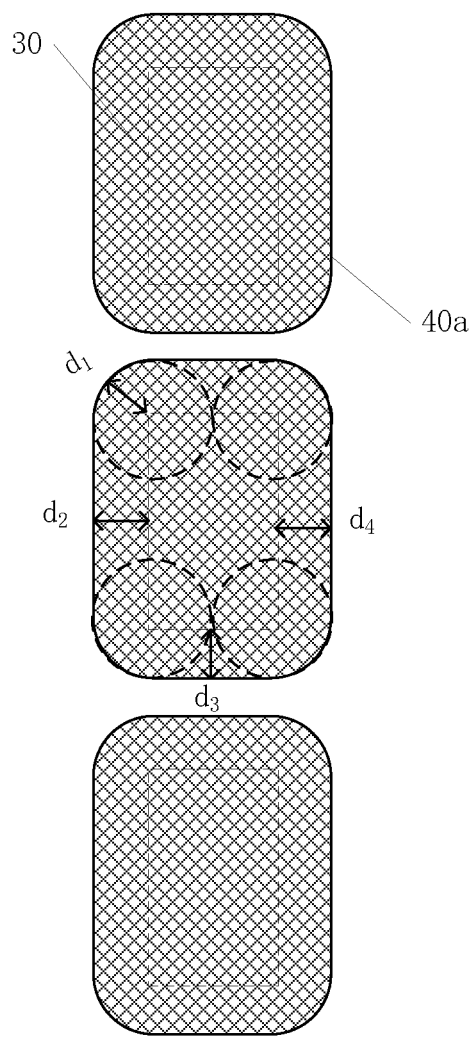
FIG. 6 illustrates another exemplary comparison of pixels with images of the pixels after passing through a birefringent structure, consistent with the disclosed embodiments.

FIG. 6 illustrates another exemplary comparison of pixels with images of the pixels after passing through the birefringent structure. The pixels 30 have a rectangular shape, and the images 41a have a shape of rounded rectangle.

In FIG. 6, an area represented by a dashed box is an area of the pixel 30. An area of the image 40a is larger than the area of the pixel 30. Minimum distances between edges of the orthographic projection of the image 40a on the plane of the birefringent structure and edges of the orthographic projection of the corresponding pixel 30 on the plane of the birefringent structure, are d1, d2, d3, and d4, respectively, where d1=d2=d3=d4. In this case, center points of the pixel 30 and the image 40a are coincident, and the light-exiting area of the pixel 30 may be enlarged. Since d1=d2=d3=d4, display uniformity may be ensured, and display quality may be improved. It should be noted that d1, d2, d3 and d4 are the shortest distances, not distances between any two points. Locations of the shortest distances may be seen from FIG. 6.

In the present disclosure, one pixel 30 may be divided into an infinite number of points. Due to the relative rotation between the birefringent structure 20 and the display panel 10, each of the infinite number of points rotates on its original position. As shown in FIG. 6, four corners of the rectangular pixel 30 may respectively rotate into a circle on their original positions, and the image 40a finally formed by the rectangular pixel 30 is a rounded rectangle. Accordingly, the area of the image 40a may be visually enlarged, and the light-exiting area of each pixel of the display device may be increased. As such, gaps between the images 40a may be decreased, the screen window effect caused by the black matrix in the prior art may be weakened, and the display effect may thus be improved.

The pixel 30 may have other shapes, such as a circle or a triangle. When the pixel has a shape of circle, the image correspondingly is a circle whose light-exiting area may be enlarged. When the pixel has a shape of triangle, the image correspondingly is a rounded triangle. The rounded triangle refers to a triangle whose three corners have a circular arc shape. Lines connecting centers of the three circular arcs show an area of the pixel 30. The present disclosure does not limit shapes of the pixel.

Figure 7:
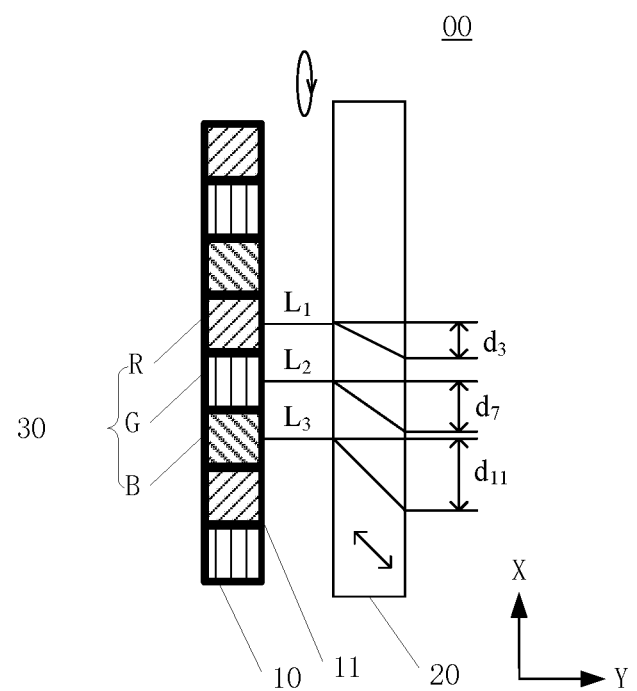
FIG. 7 illustrates another exemplary display device consistent with the disclosed embodiments.
Figure 8:
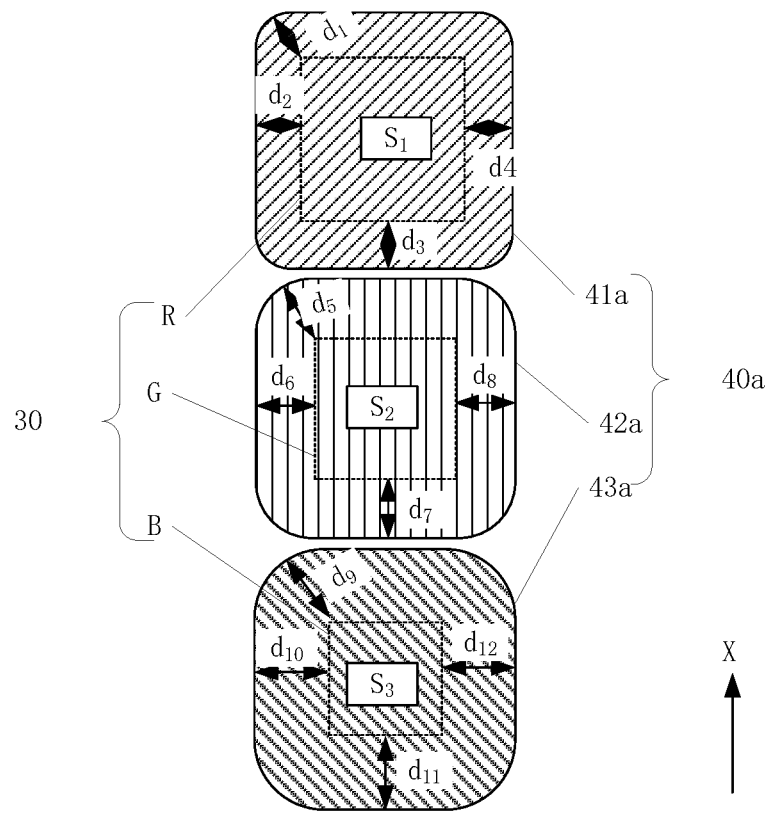
FIG. 8 illustrates an exemplary comparison of a pixel with an image of the pixel after passing through the birefringent structure in the exemplary display device illustrated in FIG. 7, consistent with the disclosed embodiments.

FIG. 7 illustrates another exemplary display device consistent with the disclosed embodiments. FIG. 8 illustrates an exemplary comparison of a pixel with an image of the pixel after passing through a birefringent structure in the exemplary display device illustrated in FIG. 7. The pixel 30 in FIG. 7 and FIG. 8 includes a first sub-pixel R, a second sub-pixel G, and a third sub-pixel B. The first sub-pixel R has an area of S1, the second sub-pixel G has an area of S2, and the third sub-pixel B has an area of S3, where S1>S2>S3. In FIG. 8, the image 40a includes a first sub-image 41a, a second sub-image 42a, and a third sub-image 43a. The first sub-image 41a, the second sub-image 42a, and the third sub-image 43a have a same area.

After passing the birefringent structure, lights L1, L2, and L3 with different wavelengths may be deflected by different distances. When the wavelengths increase, the deflection distances may sequentially decrease after passing through the birefringent structure 20. As shown in FIG. 7 and FIG. 8, after passing through the birefringent structure 20, the lights L1, L2, and L3 are deflected by different distances d1, d5 and d9, where d1<d5<d9. Accordingly, to make the images 41a, 42a and 43a have a same area, the area S1 of the first sub-pixel R, the area S2 of the second sub-pixel G, and the area S3 of the third sub-pixel B are adjusted. The deflection distance of red light L1 is the smallest, and the area of the first sub-pixel R may be set to be the largest. Correspondingly, the area of the second sub-pixel G may be set to be the second largest, and the area of the third sub-pixel B may be set to be the smallest. With such a configuration, the areas of the images 41a, 42a, and 43a may be same. As shown in FIG. 8, since the images 41a, 42a, and 43a have a same display area, the display may be more uniform, and the display effect may thus be improved.

In one embodiment, the minimum distances between edges of the orthographic projection of the image 41a on the plane of the birefringent structure and edges of the orthographic projection of corresponding sub-pixel R on the plane of the birefringent structure are d1, d2, d3, and d4, respectively, where d1=d2=d3=d4. The minimum distances between edges of the orthographic projection of the image 42a on the plane of the birefringent structure and edges of the orthographic projection of corresponding sub-pixel G on the plane of the birefringent structure are d5, d6, d7, and d8, respectively, where d5=d6=D7=d8. The minimum distances between edges of the orthographic projection of the image 43a on the plane of the birefringent structure and edges of the orthographic projection of corresponding sub-pixel B on the plane of the birefringent structure are d9, d10, d11, and d12, respectively, where d9=d10=d11=d12. In this configuration, the images 41a, 42a, and 43a are evenly distributed, and the light-exiting areas of pixels may thus be enlarged.

In one embodiment, with continued reference to FIGS. 1 and 4, during the display stage, there is a relative rotation between the birefringent structure and the display panel, and a rotation speed of the relative rotation is greater than approximately 60 Hz. Lights from the light-exiting side of the display panel 10 may be deflected after passing through the birefringent structure 20. Only when the rotation speed of the relative rotation is greater than approximately 60 Hz, images may appear to be enlarged under a visual residual effect of the deflected lights, and thus the screen window effect may be weakened.

In one embodiment, with continued reference to FIG. 1, when the display device 00 is in a display stage, the display panel 10 is stationary, and the birefringent structure 20 remains rotating. Preferably, the relative rotation speed is above approximately 60 Hz. Since the birefringent structure 20 is on the light-exiting side of the display panel 10, and rotates relative to the display panel 10, areas of the images may be visually enlarged. Accordingly, the light-exiting area of each pixel 30 of the display device 00 may be increased, the screen window effect caused by the black matrix may be weakened, and the display effect may thus be improved.

Figure 9:
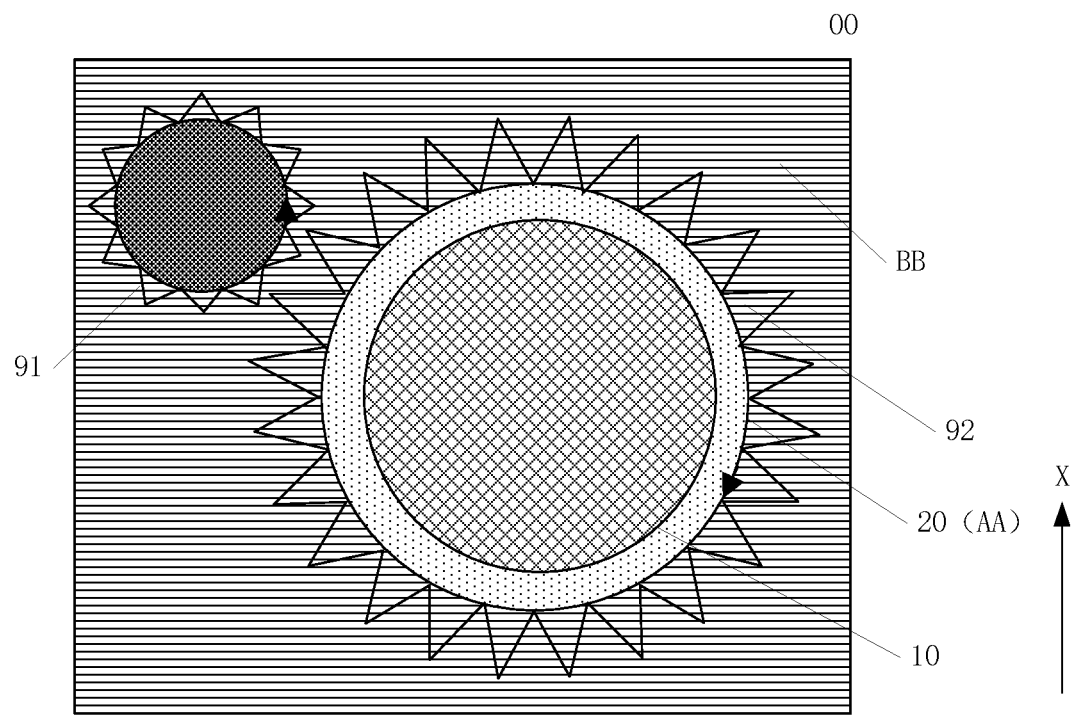
FIG. 9 illustrates an exemplary Y-direction view of the exemplary display device illustrated in FIG. 1, consistent with the disclosed embodiments.

FIG. 9 illustrates an exemplary Y-direction view of FIG. 1, consistent with the disclosed embodiments. In FIG. 9, the display device includes a display area AA and a non-display area BB, and the non-display area BB surrounds the display area AA. The non-display area BB is disposed with a driving gear 91, and a driven gear 92 is disposed at an outer edge of the birefringent structure 20. The driven gear 92 meshes with the driving gear 91. In FIG. 9, the driving gear 91 rotates to drive the driven gear 92, and then the birefringent structure 20 rotates. FIG. 9 exemplarily shows that a rotation direction of the birefringent structure 20 is clockwise. The rotation direction of the birefringent structure 20 depends on the rotation direction of the driving gear 91, and the present disclosure does not limit the rotation direction of the birefringent structure 20. A gear ratio between the driving gear 91 and the driven gear 92 may be determined according to actual needs. Preferably, when the rotation speed of the birefringent structure 20 is approximately 60 Hz or more, the light-exiting areas of the pixels may be enlarged, and the gap between the images may be reduced. Accordingly, the screen window effect may be weakened, and the display effect may thus be improved.

As shown in FIG. 9, the birefringent structure 20 may have a circular shape. The circular shape may facilitate engagement between the driving gear 91 and the driven gear 92 to drive the birefringent structure 20 to rotate. This type of structure may be preferably suitable for use in projector apparatus.

In FIG. 9, lights from the light-exiting side of the panel 10 may be refracted after passing through the birefringent structure 20, and thus the light-exiting areas of the pixels may be enlarged. Accordingly, the display area AA may be larger than the area of the display panel 10.

In one embodiment, with continued reference to FIG. 9, a motor (not shown) is also included. The motor is in the non-display area BB and connected to the driving gear 91 for driving the driving gear. Since the motor is in the non-display area BB and does not occupy the display area AA, the display effect may be improved.

Figure 10:
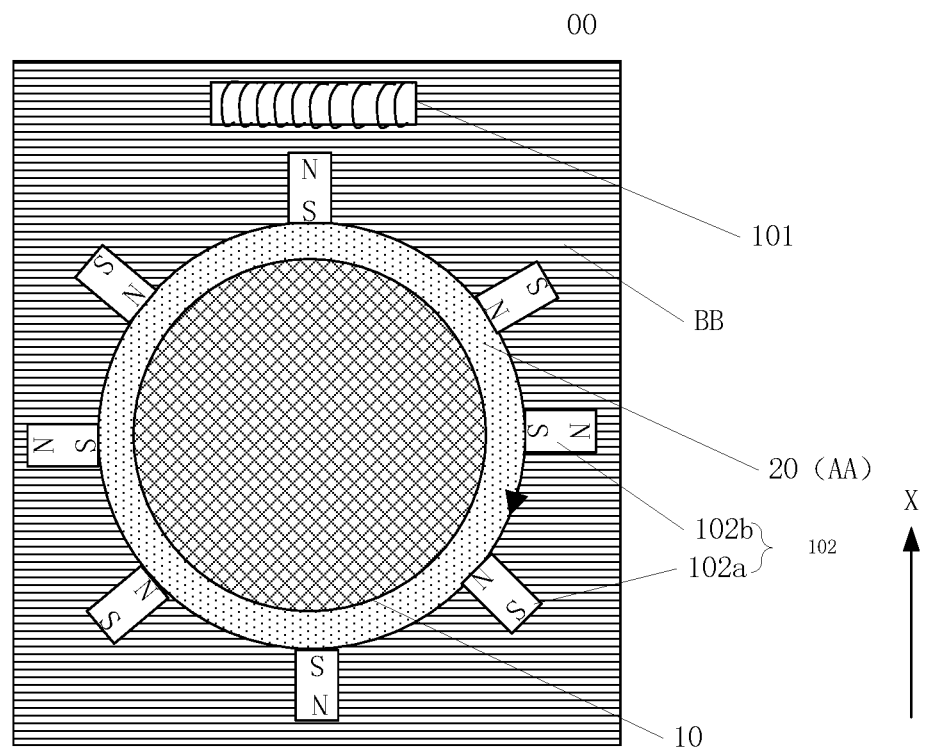
FIG. 10 illustrates another exemplary Y-direction view of the exemplary display device illustrated in FIG. 1, consistent with the disclosed embodiments.

FIG. 10 illustrates another exemplary Y-direction view of FIG. 1. The display device includes a display area AA and a non-display area BB, and the non-display area BB surrounds the display area AA. The non-display area BB is disposed with a magnetic coil 101, and an outer edge of the birefringent structure 20 is disposed with electromagnets 102. Two adjacent electromagnets 102 have opposite magnetic poles. When an electromagnet 102a is an S pole, an adjacent electromagnet 102b is an N pole. When an alternating current is provided to the magnetic coil 101, the birefringent structure 20 may be rotated by a magnetic field effect of the alternating current. Preferably, when the rotation speed of the birefringent structure 20 is approximately 60 Hz or more, the light-exiting areas of the pixels may be enlarged, and the gaps between the images may be reduced. Accordingly, the screen window effect may be weakened, and the display effect may thus be improved.

It should be noted that since each of the electromagnets 102 has two ends and the magnetic poles of the two ends are opposite. In one embodiment, the magnetic poles of two adjacent electromagnets 102 are opposite, that is, the magnetic poles on a same side are opposite. For example, ends of the electromagnet 102a and the electromagnet 102b away from the birefringent structure 20 are an S pole and an N pole, respectively. The present disclosure does not limit the number of and spacing between the electromagnets 102. The choice of the number of and spacing between the electromagnets 102 should ensure that the rotation of the birefringent structure 20 can be realized, and the light-exiting areas of the pixels can be enlarged.

In FIG. 10, the lights from the light-exiting side of the panel 10 may be refracted after passing through the birefringent structure 20, and thus the light-exiting areas of the pixels may be enlarged. Accordingly, the area of the display area AA may be larger than the area of the display panel 10. FIG. 10 exemplarily indicates that the rotation direction of the birefringent structure 20 is clockwise, and the present disclosure does not limit the rotation direction of the birefringent structure 20.

In one embodiment, with continued reference to FIG. 10, in the non-display area BB, a power supply (not shown) is connected to the magnetic coil 101 for supplying an alternating current to the magnetic coil 101. After the alternating current is supplied to the magnetic coil 101, due to electromagnetic effects, the electromagnets 102 may drive the birefringent structure 20 to rotate. Preferably, when the rotation speed of the birefringent structure 20 is approximately 60 Hz or more, the light-exiting areas of the pixels may be enlarged, and the gaps between the images may be reduced. Accordingly, the screen window effect may be weakened, and the display effect may thus be improved.

In one embodiment, with continued reference to FIG. 1, when the display device 00 is in a display stage, the birefringent structure 20 is stationary, and the display panel 10 remains rotating. Preferably, the relative rotation speed between the birefringent structure 20 and the display panel 10 is above approximately 60 Hz. When the display panel 10 rotates, there is a relative rotation between the display panel 10 and the stationary birefringent structure 20. The areas of the images may be visually enlarged, and the light-exiting area of each pixel 30 of the display device 00 may be increased. Accordingly, the screen window effect caused by the black matrix may be weakened, and the display effect may thus be improved.

Figure 11:
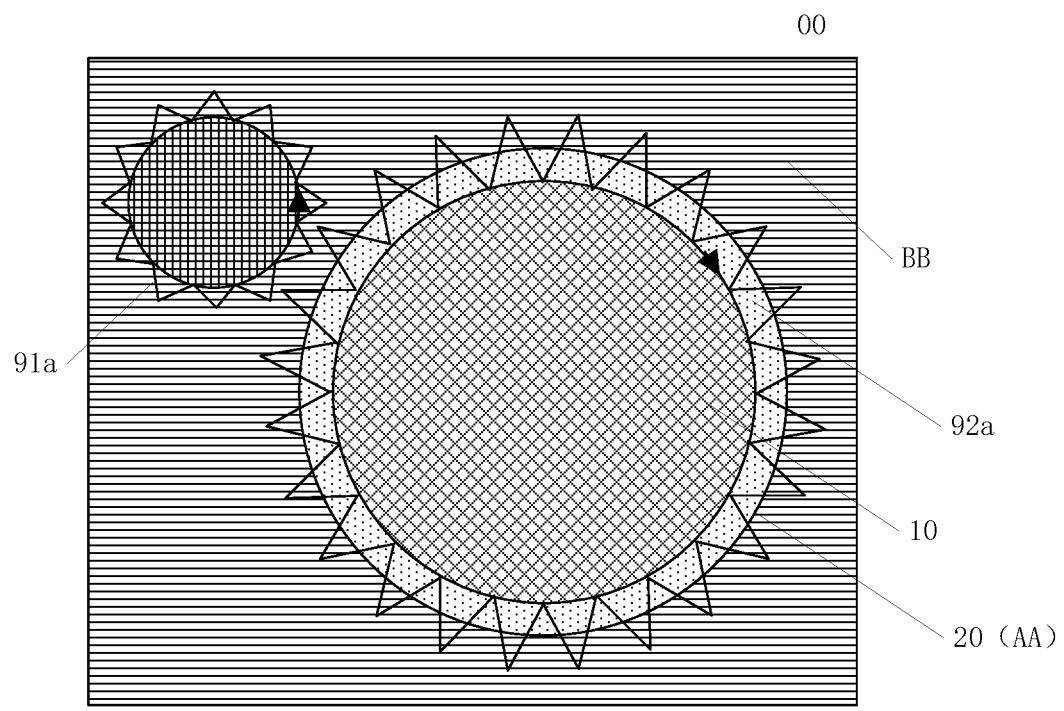
FIG. 11 illustrates another exemplary Y-direction view of the exemplary display device illustrated in FIG. 1, consistent with the disclosed embodiments.

FIG. 11 illustrates another exemplary Y-direction view of FIG. 1. As shown in FIG. 11, the display device 00 includes a display area AA and a non-display area BB, and the non-display area BB surrounds the display area AA. The non-display area BB is disposed with a driving gear 91a, and the outer edge of the display panel 10 is disposed with a driven gear 92a. The driven gear 92a meshes with the driving gear 91a. Lights from the light-exiting side of the panel 10 may be refracted after passing through the birefringent structure 20. Accordingly, the light-exiting areas of the pixels may be enlarged, and the area of the display area AA may be larger than the area of the display panel 10.

In FIG. 11, the driving gear 91a rotates to drive the driven gear 92a, and then the display panel 10 rotates. FIG. 11 exemplarily shows that the rotation direction of the display panel 10 is clockwise. The rotation direction of the display panel 10 depends on the rotation direction of the driving gear 91a, and the present disclosure does not limit the rotation direction of the display panel 10. The gear ratio between the driving gear 91a and the driven gear 92a may be determined according to actual needs. Preferably, when the display panel rotates, the light-exiting areas of the pixels may be enlarged, and the gaps between the images may be reduced. Accordingly, the screen window effect may be weakened, and the display effect may thus be improved. In FIG. 11, preferably, the display panel has a circular shape. The circular shape may facilitate engagement between the driving gear 91a and the driven gear 92a for driving the display panel 10 to rotate.

In one embodiment, with continued reference to FIG. 11, a motor (not shown) is also included. The motor is in the non-display area BB and connected to the driving gear 91a for driving the driving gear. Since the motor is in the non-display area BB, it does not occupy the display area AA, and the display effect may thus be improved.

Figure 12:
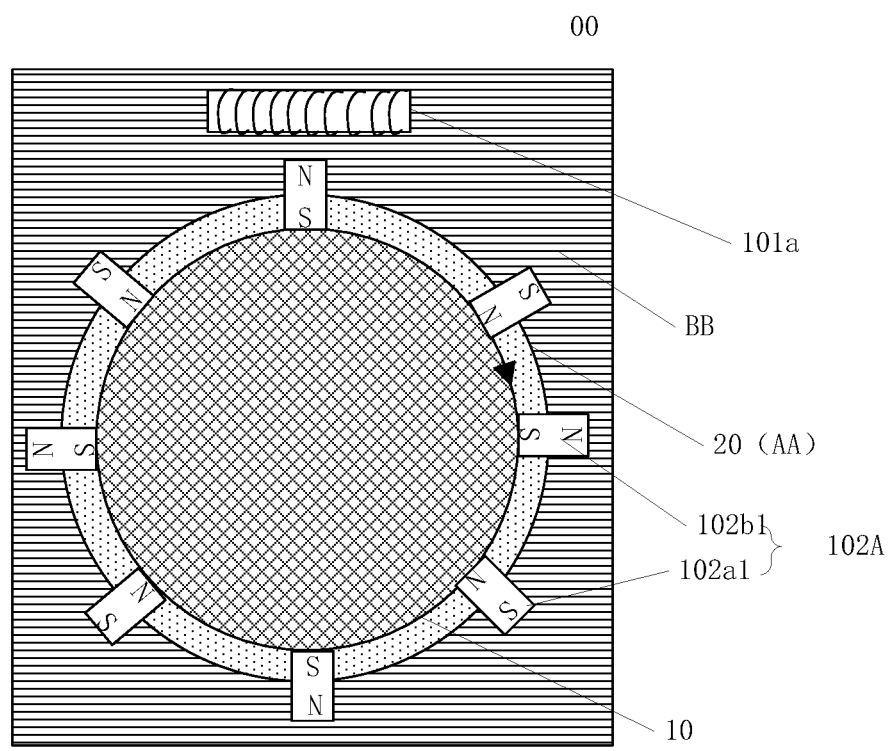
FIG. 12 illustrates another exemplary Y-direction view of the exemplary display device illustrated in FIG. 1, consistent with the disclosed embodiments.

FIG. 12 illustrates another exemplary Y-direction view of FIG. 1. The display device includes a display area AA and a non-display area BB. The non-display area BB surrounds the display area AA. The non-display area BB is disposed with a magnetic coil 101a. The outer edge of the birefringent structure 20 is disposed with electromagnets 102A, and two adjacent electromagnets 102A have opposite magnetic poles.

When the electromagnet 102a1 is an S pole, the adjacent electromagnet 102b1 is an N pole. When an alternating current is provided to the magnetic coil 101a, the display panel 10 may be rotated by magnetic field effects of the alternating current. When the display panel rotates (at a rotation speed approximately 60 Hz or more), the light-exiting areas of the pixels may be enlarged, and the gaps between the images may be reduced. Accordingly, the screen window effect may be weakened, and the display effect may thus be improved.

It should be noted that since each of the electromagnets 102A has two ends and the magnetic poles of the two ends are opposite. In one embodiment, the magnetic poles of two adjacent electromagnets 102A are opposite. That is, the magnetic poles on a same side are opposite. For example, ends of the electromagnet 102a1 and the electromagnet 102b1 away from the display panel 10 are an S pole and an N pole, respectively. The present disclosure does not limit the number of and spacing between the electromagnets 102A. The choice of the number of and spacing between the electromagnets 102A should ensure that the rotation of the display panel 10 can be realized, and the light-exiting areas of the pixels can be enlarged. FIG. 12 exemplarily shows that a rotation direction of the display panel 10 is clockwise. The rotation direction of the display panel may be determined according to actual needs, In FIG. 12, lights from the light-exiting side of the display panel 10 are refracted after passing through the birefringent structure 20, and thus the light-exiting areas of the pixels may be enlarged. Accordingly, the area of the display area AA may be larger than the area of the display panel 10.

In one embodiment, with continued reference to FIG. 12, in the non-display area BB, a power supply (not shown) is connected to the magnetic coil 101a for supplying an alternating current to the magnetic coil 101a. After the alternating current is supplied to the magnetic coil 101a, due to electromagnetic effects, the electromagnets 102A may drive the display panel 10 to rotate. When the display panel 10 rotates, the light-exiting areas of the pixels may be enlarged, and the gaps between the images may be reduced. Accordingly, the screen window effect may be weakened, and the display effect may thus be improved.

In some embodiments, as shown in FIG. 1, FIG. 9 and FIG. 10, a cross section of the birefringent structure 20 in the first direction X has a circular shape, and the first direction X is parallel to the plane of the display panel 10. The circular cross section of the birefringent structure 20 in the first direction X is favorable for fixing the birefringent structure 20 in the non-display area BB for rotation. Further, since the lights from the pixels 30 in the display panel 10 may be deflected after passing through the birefringent structure 20, the light-exiting areas may be enlarged and may have rounded corners (for example, see FIG. 8). Accordingly, the circular shape of the birefringent structure 20 may prevent occurrence of light leakage.

In one embodiment, referring to FIG. 1, when the display device 00 is in a display stage, both the birefringent structure 20 and the display panel 10 may rotate. The rotation speed of the birefringent structure 20 may be different from the rotation speed of the display panel 10. Preferably, the relative rotation speed between the birefringent structure 20 and the display panel 10 is above approximately 60 Hz. For example, when the rotation speed of the display panel 10 is 10 Hz, to achieve the purpose of enlarging the light-exiting areas of the pixels, the rotation speed of the birefringent structure 20 should be greater than or equal to approximately 70 Hz.

In some embodiments, referring to FIGS. 1, 9, and 10, the display device 00 includes a display area AA. During the display stage, when there is a relative rotation between the birefringent structure 20 and the display panel 10, the birefringent structure 20 at least completely covers the display area AA. The lights emitted from the display panel 10 may be deflected. Since the birefringent structure 20 at least completely covers the display area AA, lights emitted from all the pixels 30 in the display panel 10 pass through the birefringent structure. Accordingly, light leakage may be prevented, and the display effect may thus be improved.

Referring to FIG. 1, the birefringent structure 20 is made of a material including at least one of quartz, calcite, lithium niobate, lithium niobite, or bismuth metaborate. Selection of material needs to meet requirements that there is a relative rotation between the birefringent structure 20 and the display panel 10, and lights emitted from the pixels pass through the birefringent structure to form a plurality of images larger than the pixels. In this way, the screen window effect may be weakened, and the display quality may be improved.

Figure 13:
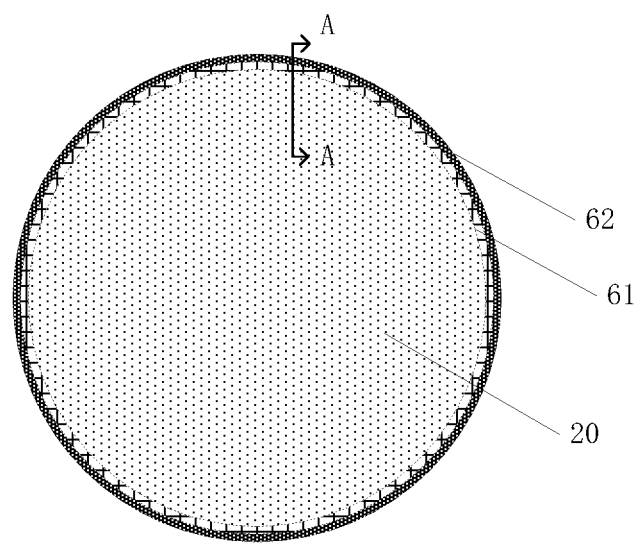
FIG. 13 illustrates installation of an exemplary birefringent structure consistent with the disclosed embodiments.
Figure 14:
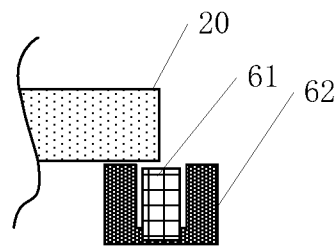
FIG. 14 illustrates an exemplary cross-sectional view taken along cross section A-A in FIG. 13, consistent with the disclosed embodiments.

FIG. 13 illustrates installation of an exemplary birefringent structure consistent with the disclosed embodiments, and FIG. 14 illustrates an exemplary cross-sectional view taken along cross section A-A in FIG. 13. Referring to FIG. 13 and FIG. 14, the display device includes a first slot 62, and the birefringent structure 20 is disposed with a first protrusion 61 that matches the first slot 62. The first protrusion 61 is engaged into the first slot 62. The first protrusion 61 may be disposed on the outer edge of the birefringent structure 20; or the protrusion 61 may be disposed in a way as shown in FIG. 14 provided that the first protrusion 61 may be engaged into the first slot 62, thereby fixing the birefringence structure 20. This kind of configuration may make the birefringent structure 20 rotate smoothly and make the connection structure stable.

The structure with a slot matching a protrusion may also be used in the display panel that is rotatable. The display device may have a slot, and the display panel may be disposed with a protrusion. After the slot matches the protrusion, fixed engagement of the display panel may be realized.

Figure 15:
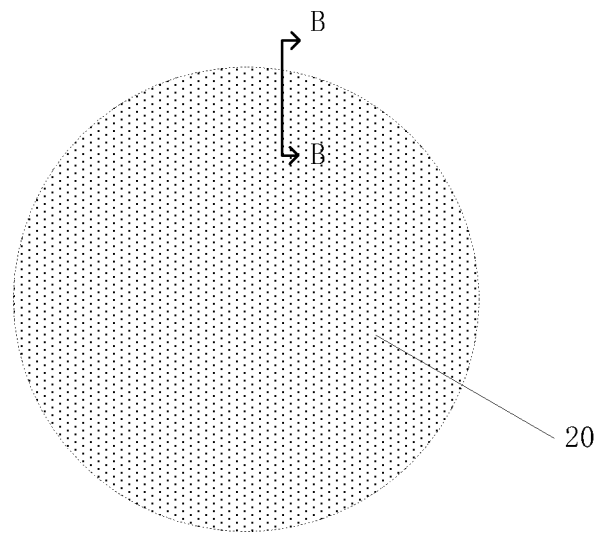
FIG. 15 illustrates installation of another exemplary birefringent structure consistent with the disclosed embodiments.
Figure 16:
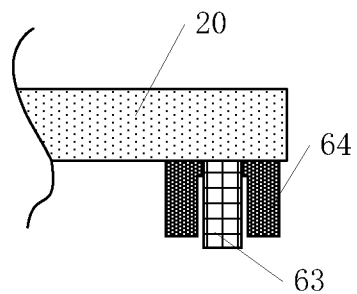
FIG. 16 illustrates an exemplary cross-sectional view taken along cross section B-B in FIG. 15, consistent with the disclosed embodiments.

FIG. 15 illustrates installation of another exemplary birefringent structure consistent with the disclosed embodiments, and FIG. 16 illustrates an exemplary cross-sectional view taken along cross section B-B in FIG. 15. In one embodiment, referring to FIG. 15 and FIG. 16, the display device is disposed with a second protrusion 63, and the birefringent structure 20 has a second slot 64. The second protrusion 63 matches the second lot 64, and the second protrusion 63 is engaged in the second slot 64. The second slot 64 may be located at the outer edge of the birefringent structure 20. As shown in FIG. 16, as long as the second protrusion 63 is engaged in the second card slot 64, the birefringence structure 20 may be fixed. This kind of matching method may make the birefringent structure 20 rotate smoothly and make the connection structure stable.

Figure 17:
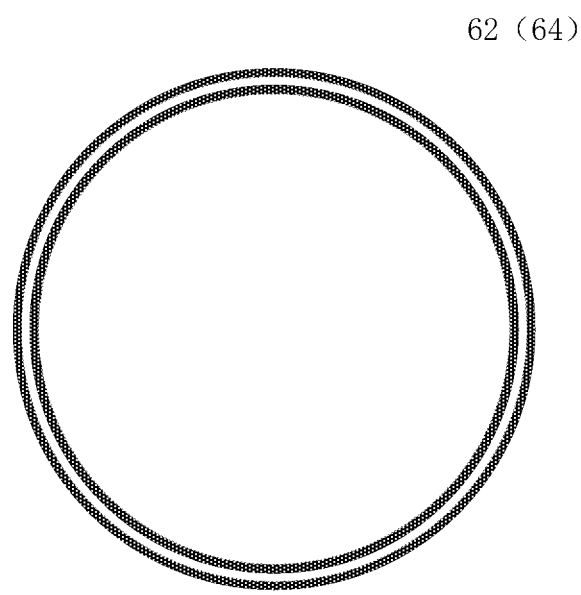
FIG. 17 illustrates a principal view of an exemplary first slot or an exemplary second slot, consistent with the disclosed embodiments.

FIG. 17 illustrates a principal view of an exemplary first slot or an exemplary second slot, consistent with the disclosed embodiments. The first slot 62 and/or the second slot 64 may be an annular slot. That is, the first slot 62 may be an annular slot, and the second slot 64 may be an annular slot. The annular slots may facilitate rotation of the birefringent structure.

Referring to FIG. 1, the display panel 10 may be a liquid crystal display panel or an organic light emitting display panel. The display panel 10 may be a liquid crystal display panel of the prior art, including a color film substrate and an array substrate oppositely disposed, and a liquid crystal layer between the color film substrate and the array substrate. The display panel 10 may also be an organic light emitting display panel. The present disclosure does not limit specific structures of the display panel.

As disclosed, the technical solutions of the present disclosure have the following advantages.

A display device of the present invention includes a display panel including a light-exiting side. A birefringent structure is disposed at the light-exiting side of the display panel, and a plane of the birefringent structure is parallel to a plane of the display panel. When the display device is in a display stage, at a plane parallel to the plane of the birefringent structure, there is a relative rotation between the birefringent structure and the display panel. Since the birefringence structure is at the light-exiting side of the display panel and rotates relative to the display panel, image areas may be visually enlarged. Accordingly, the light-exiting area of each pixel of the display device may be increased, the screen window effect caused by the black matrix may be weakened, and the display effect may thus be improved.

The embodiments disclosed herein are exemplary only and not limiting the scope of this disclosure. Various combinations, alternations, modifications, or equivalents to the technical solutions of the disclosed embodiments can be obvious to those skilled in the art and can be included in this disclosure. Without departing from the spirit and scope of this invention, such other modifications, equivalents, or improvements to the disclosed embodiments are intended to be encompassed within the scope of the present disclosure.

What is claimed is:

1. A display device, comprising:
    a display panel, including a plurality of pixels emitting light from a light-exiting side; and
    a birefringent structure disposed at the light-exiting side of the display panel,
    wherein:
    a plane of the birefringent structure is parallel to a plane of the display panel;
    an optical axis of the birefringent structure forms an acute angle with respect to a first direction, the first direction being a direction perpendicular to the plane of the birefringent structure toward a light-exiting direction;
    a direction of the optical axis of the birefringent structure directly controls the light emitted from each of the plurality of pixels to be deflected by a deflection distance; and
    when the display device is in a display stage, the birefringent structure and the display panel are configured with a relative rotation at a plane parallel to the plane of the birefringent structure to enlarge each of the plurality of pixels by the deflection distance at all sides without moving a center point of the corresponding pixel to cover at least a portion of gaps between the plurality of pixels.

2. The display device according to claim 1, further comprising:

a polarizer between the display panel and the birefringent structure, wherein a plane of the polarizer is parallel to the plane of the display panel.

3. The display device according to claim 1, wherein:
a plurality of images is formed after lights from the plurality of pixels pass through the birefringent structure; and
orthographic projections of adjacent images in the plurality of images on the plane of the birefringent structure are non-overlapped.

4. The display device according to claim 3, wherein:
an area of each of the images is larger than an area of a corresponding pixel; and
shortest distances between edges of the orthographic projection of each of the images on the plane of the birefringent structure and edges of an orthographic projection of a corresponding pixel on the plane of the birefringent structure are equal.

5. The display device according to claim 4, wherein the pixels have a rectangular shape, and the images have a shape of rounded rectangle.

6. The display device according to claim 3, wherein:
the pixel includes a first sub-pixel, a second sub-pixel, and a third sub-pixel;
the first sub-pixel includes a red sub-pixel having an area of S1, the second sub-pixel includes a green sub-pixel having an area of S2, and the third sub-pixel includes a blue sub-pixel having an area of S3, where S1>S2>S3; and
the image of the pixel includes a first sub-image, a second sub-image, and a third sub-image, and the first sub-image, the second sub-image, and the third sub-image have a same area.

7. The display device according to claim 1, wherein, during the display stage, the relative rotation between the birefringent structure and the display panel has a rotation speed greater than approximately 60 Hz.

8. The display device according to claim 1, wherein when the display device is in the display stage, the display panel is stationary, and the birefringent structure remains rotating.

9. The display device according to claim 8, wherein:
the display device includes a display area and a non-display area surrounding the display area;
a driving gear is disposed in the non-display area, and a driven gear is disposed at an outer edge of the birefringent structure; and
the driven gear meshes with the driving gear.

10. The display device according to claim 9, further comprising:
a motor located in the non-display area, wherein the motor is connected to the driving gear for driving the driving gear.

11. The display device according to claim 8, wherein:
the display device includes a display area and a non-display area surrounding the display area;
a magnetic coil is disposed in the non-display area, and a plurality of electromagnets are disposed at an outer edge of the birefringent structure; and
two adjacent electromagnets have opposite magnetic poles.

12. The display device according to claim 11, wherein, in the non-display area, a power supply is connected to the magnetic coil for supplying an alternating current to the magnetic coil.

13. The display device according to claim 1, wherein, when the display device is in the display stage, the birefringent structure is stationary, and the display panel remains rotating.

14. The display device according to claim 13, wherein:
the display device includes a display area and a non-display area surrounding the display area;
a driving gear is disposed in the non-display area, and a driven gear is disposed at an outer edge of the display panel; and
the driven gear meshes with the driving gear;
a motor in the non-display area, wherein the motor is connected to the driving gear for driving the driving gear.

15. The display device according to claim 13, wherein:
the display device includes a display area and a non-display area surrounding the display area;
a magnetic coil is disposed in the non-display area, and a plurality of electromagnets are disposed at an outer edge of the birefringent structure; and
two adjacent electromagnets have opposite magnetic poles.

16. The display device according to claim 1, wherein a cross section of the birefringent structure in a first direction has a circular shape, and the first direction is parallel to the plane of the display panel.

17. The display device according to claim 1, wherein, the display device includes a display area;
when the display device is in a display stage, both the birefringent structure and the display panel rotate, and a rotation speed of the birefringent structure is different from a rotation speed of the display panel;
and during the display stage, when the relative rotation is between the birefringent structure and the display panel, the birefringent structure completely covers the display area.

18. The display device according to claim 1, wherein:
the display device has a first slot, and a first protrusion is disposed on the birefringent structure, wherein the first slot is an annular slot; and
the first protrusion matches the first slot, and the first protrusion is engaged in the first slot.

19. The display device according to claim 1, wherein:
the birefringent structure has a second slot, a second protrusion is disposed on the display device, wherein the second slot is an annular slot; and
the second protrusion matches the second slot, and the second protrusion is engaged in the second slot.

20. The display device according to claim 1, wherein the display panel is a liquid crystal display panel or an organic light emitting display panel.

* * * * *